United States Patent
Li et al.

(10) Patent No.: US 12,199,831 B2
(45) Date of Patent: Jan. 14, 2025

(54) METHOD FOR CONSTRUCTING MULTISTAGE NETWORK, RELATED METHOD AND DEVICE

(71) Applicant: Beijing Jiaotong University, Beijing (CN)

(72) Inventors: Xu Li, Beijing (CN); Mingqiang Yang, Beijing (CN); Yanan Liang, Beijing (CN); Fukang Zhao, Beijing (CN); Yunfei Zhang, Beijing (CN); Zhihao Zhou, Beijing (CN); Jun Xie, Beijing (CN); Zike Wei, Beijing (CN)

(73) Assignee: Beijing Jiaotong University, Beijing (CN)

( * ) Notice: Subject to any disclaimer, the term of this patent is extended or adjusted under 35 U.S.C. 154(b) by 0 days.

(21) Appl. No.: 18/485,464

(22) Filed: Oct. 12, 2023

(65) Prior Publication Data

US 2024/0129197 A1 Apr. 18, 2024

(30) Foreign Application Priority Data

Oct. 17, 2022 (CN) .......................... 202211269989.7

(51) Int. Cl.
*H04L 41/12* (2022.01)
*H04L 41/0806* (2022.01)

(52) U.S. Cl.
CPC .......... *H04L 41/12* (2013.01); *H04L 41/0806* (2013.01)

(58) Field of Classification Search
CPC ............................ H04L 41/12; H04L 41/0806
See application file for complete search history.

(56) References Cited

U.S. PATENT DOCUMENTS

| 6,243,361 | B1* | 6/2001 | McMillen | ............. H04L 49/358 370/254 |
| 8,073,968 | B1 | 12/2011 | Shah et al. | |
| 9,973,442 | B1* | 5/2018 | Kim | ...................... H04L 49/101 |
| 2004/0196838 | A1 | 10/2004 | Zadikian et al. | |
| 2016/0352419 | A1 | 12/2016 | Fonseka et al. | |
| 2017/0280351 | A1 | 9/2017 | Skaaksrud et al. | |

FOREIGN PATENT DOCUMENTS

| CN | 101197748 A | 6/2008 |
| CN | 109474970 A | 3/2019 |
| CN | 113163421 A | 7/2021 |

(Continued)

OTHER PUBLICATIONS

First Office Action issued in counterpart Chinese Patent Application No. 202211269989.7, dated May 17, 2024.

(Continued)

*Primary Examiner* — Schquita D Goodwin
*Assistant Examiner* — Joseph M Cousins
(74) *Attorney, Agent, or Firm* — Westbridge IP LLC

(57) ABSTRACT

A method for constructing a multistage network includes: deploying a plurality of nodes; constructing the upper network with at least one node of the plurality of nodes; and in response to determining there is an isolated node, determining an intermediate node for the isolated node and adding the isolated node into the upper network or one of the at least one sub-network according to the intermediate node.

5 Claims, 4 Drawing Sheets

(56) References Cited

FOREIGN PATENT DOCUMENTS

JP            2009171517 A      7/2009

OTHER PUBLICATIONS

Fu, Study on Efficient Routing Clustering Algorithms in Heterogeneous Wireless Sensor Networks, Journal of Xinxiang University, 2020, 6, pp. 26-31, dated Jun. 25, 2020.

Li et al., A Dynamic Pricing Approach for Self-Organized Mobile Ad Hoc Networks, GLOBECOM '05, IEEE Global Telecommunications Conference, 2006, pp. 1097-1101, dated Jan. 23, 2006.

Li et al., Overview of Wireless Cooperative Communication Protocols and Application Prospects, Radio Communications Technology, 2017, 43(3), pp. 1-7, dated May 18, 2017.

Li et al., Study on the fast network mechanism of Zigbee isolated node, Electronic Design Engineering, 2018, 14, pp. 57-61 and 66, dated Jul. 20, 2018.

* cited by examiner

METHOD FOR CONSTRUCTING MULTISTAGE NETWORK, RELATED METHOD AND DEVICE

CROSS-REFERENCE TO RELATED APPLICATIONS

This application claims priority to Chinese Patent Application No. 202211269989.7, filed on Oct. 17, 2022, the content of which is incorporated herein by reference in its entirety.

TECHNICAL FIELD

The present disclosure relates to communication technologies, and more particularly to a method for constructing a multistage network, a method for allocating resources in a multistage network and a related device.

BACKGROUND

Distributed wireless self-organizing network have following features such as self-organization, self-configuration, self-management, self-healing, no infrastructure support requirements, rapid deployments, etc. Moreover, all nodes in a traditional planar structure network are uniformly scheduled.

However, with a gradual increase in a network scale, channels occupied by information transmission become more and more crowded. Once the number of nodes in a network is larger than a certain tolerance, communication congestions or even interruptions may occur.

SUMMARY

Examples of the present disclosure provide a method for constructing a multistage network. The multistage network includes an upper network and at least one sub-network. The method for constructing a multistage network may include: deploying a plurality of nodes; constructing the upper network with at least one node of the plurality of nodes; and in response to determining there is an isolated node, determining an intermediate node for the isolated node and adding the isolated node into the upper network or one of the at least one sub-network according to the intermediate node.

Examples of the present disclosure also provide a method for allocating resources in the multistage network. The method for allocating resources in the multistage network may include: constructing a route from a source node to a destination node in the multistage network; and allocating resources from the source node to the destination node along the route.

Moreover, the present disclosure also provides an electronic device, which includes: a memory, a processor, and a computer program stored in the memory and executable on the processor, where the processor executes the computer program to implement the above method.

It can be seen from the methods and related device disclosed, the plurality of nodes deployed can construct a multistage network in a self-organization manner. In this process, there is no need for a network manager to configure every node in the network one by one. Therefore, an efficiency of networking can be greatly improved.

BRIEF DESCRIPTION OF THE DRAWINGS

In order to describe technical solutions of the present application or related arts more clearly, accompanying drawings required for describing examples or the related art are introduced briefly in the following. Apparently, the accompanying drawings in the following descriptions only illustrate some examples of the present application, and those of ordinary skill in the art may still derive other drawings from these drawings without creative efforts.

DETAILED DESCRIPTION OF THE EMBODIMENTS

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

Figure 1:
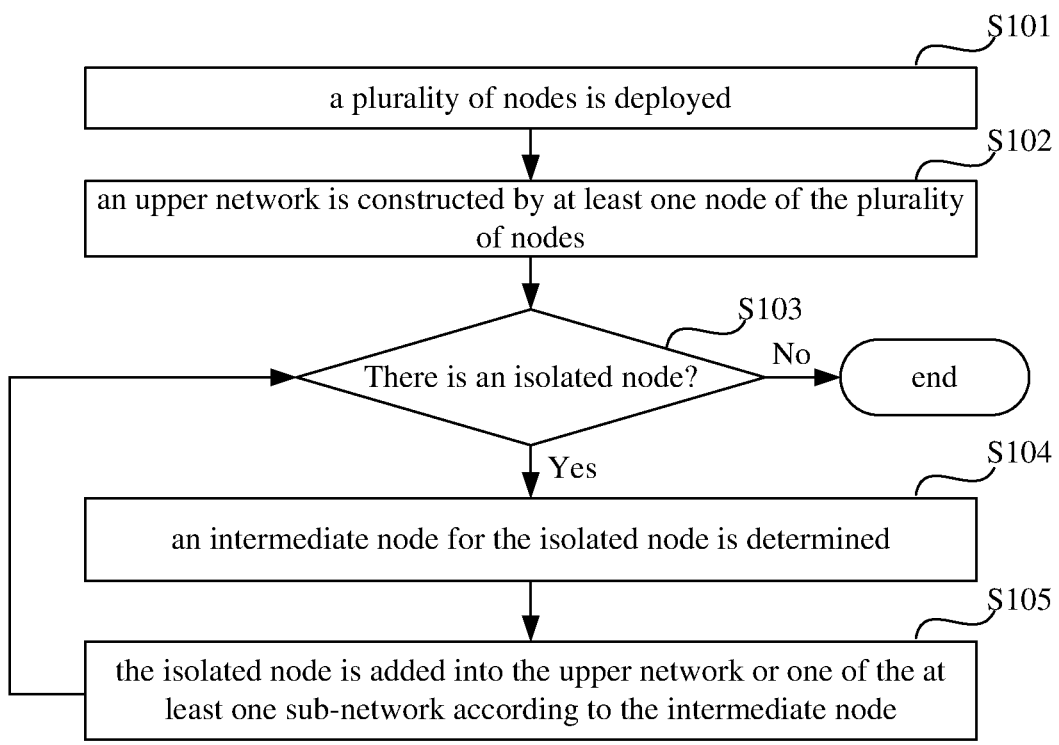
FIG. 1 is a schematic flowchart of a method for constructing a multistage network according to an example of the present disclosure.

One example of the present disclosure provides a method for constructing a multistage network. The method for constructing a multistage network disclosed is based on hierarchical networking. According to examples of the present disclosure, the multistage network may include an upper network and at least one sub-network. As shown in FIG. 1, the method may include the following steps.

As disclosed above, the multistage network constructed in this example only includes one upper network and at least one sub-network. However, if there is a need for further expanding the multistage network, a larger network with a plurality of multistage networks can also be constructed by applying the method of the present disclosure without making any creative efforts. It is apparent that such settings are also within the scope of the present disclosure.

In step S101, a plurality of nodes is deployed.

In examples of the present disclosure, the plurality of nodes deployed are the nodes used to construct the multistage network. Moreover, each of the plurality of nodes may be configured with some parameters, such as, an attribute, a networking state and an on-network time. The attribute of a node may include primary or non-primary to indicate an importance of the node, such as, whether a node is a primary node or a non-primary node. The networking state may indicate to which network the node belongs. Specifically, the networking state of a node may include: having joined the upper network, having joined a sub-network, or having not joined any network. The on-network time indicates time information about when the node joined the upper network or the sub-network.

In step S102, an upper network is constructed by at least one node of the plurality of nodes.

In step S103, whether there is an isolated node among the plurality of nodes is determined.

In some examples of the present disclosure, an isolated node refers to a node among the plurality of nodes that has not joined any network. As one would know, after the upper network is constructed, there would still be one or more isolated nodes among the plurality of nodes which have not joined the upper network.

If there is an isolated node, for each isolated node, steps S104-S105 would be performed. Moreover, if there is no isolated node, it means that the method for constructing the multistage network ends. Therefore, in this case, the procedure would be terminated.

In step S104, an intermediate node for the isolated node is determined.

In step S105, the isolated node is added into the upper network or one of the at least one sub-network according to the intermediate node.

To be noted, the above step S103-S105 would be repeated until there is no isolated node among the plurality of nodes. That is, in response to determining that there is no isolated node, or all the plurality of nodes belong to the upper network or a sub-network, the construction process of the multistage network is completed.

It can be seen from the method disclosed, the plurality of nodes deployed can construct a multistage network in a self-organization manner. In this process, there is no need for a network manager to configure every node in the network one by one. Therefore, the efficiency of networking can be greatly improved.

Moreover, by the above method, a multistage network can be constructed quickly. Moreover, the problems of a limited scale of a distributed network with a planar structure can be solved. The method can also be used to setup a large-scale self-organizing network with more nodes. Also, the structure of the multistage network is relatively simple and clear, which makes managements and expansions of the network easier.

In the following, specific examples of the present disclosure would be described in detail.

In some examples of the present disclosure, in step S102, the upper network may be constructed with powered-on nodes having a capability of networking among the plurality of nodes. That is, the upper network would be constructed automatically by those powered-on nodes through their own capabilities of networking.

Specifically, according to examples of the present disclosure, at the time of constructing the upper network, every powered-on node is detected. If all nodes deployed are powered-on at the time, the upper network is constructed by nodes with a capability of networking among the nodes deployed. If only a part of the nodes deployed are powered-on at the time, the upper network is constructed by nodes with a capability of networking among the powered-on nodes. In a more specific example, there may be only one node which is powered-on and with the capability of networking. In this example, this node would make up the upper network by itself.

In view of each node deployed, the following procedure may be executed by the node.

At first, after being powered-on, the node may detect the presence of any network by scanning channels of networks.

In response to determining that there is no network, the node may further determine whether the node itself is capable of networking.

In response to determining that the node itself is capable of networking, the node may construct the upper network with other nodes with the capability of networking.

Moreover, in response to determining that the node itself is not capable of networking, the node may return to the step of scanning channels until a network constructed by other nodes at a previous moment can be detected. Then, the node may act as an isolate node to execute subsequent steps such as S104-S105 to join the network.

Further, in response to determining that there is a network existed, the node may also act as an isolate node to execute subsequent steps such as S104-S105 to join the network. For example, a node with the capability of networking is powered-on later and an upper network has already been constructed, the node may also act as an isolate node to execute subsequent steps such as S104-S105 to join the network.

In specific implementations, a network manager may configure some nodes among the plurality of nodes deployed with the capability of networking, and also make these nodes be powered-on at a first moment of networking. In this way, these nodes may form the upper network.

According to some examples of the present disclosure, in step S104, an isolated node may perform the following steps to determine its intermediate node.

At first, the isolated node broadcasts a network entry request to the plurality of nodes deployed.

After the isolated node broadcasts the network entry request, a node within a communication range of the isolated node would receive the network entry request. Then, the node within the communication range of the isolated node would feedback a feedback message to the isolated node. Moreover, the node would attach its networking state and its on-network time into the feedback message. Further, the attribute of the node may also be attached in the feedback message.

When the isolated node receives a feedback message, the isolated node may take the source node of the feedback message as a candidate intermediate node according to the networking state of the source node. Specifically, the isolated node would detect whether the source node has joined the upper network or a sub-network according to the networking state of the source node first. In response to determining that the source node has joined the upper network or a sub-network, the isolated node may take the source node of the feedback message as one candidate intermediate node. However, in response to determining that the source node has not joined any network, the isolated node may not take the source node of the feedback message as one candidate intermediate node. It can be seen that a candidate intermediate node of an isolate node would be a node that has joined the upper network or a sub-network within the communication range of the isolated node.

To be noted, the objective of the above example is to constitute a multistage network, that is why the intermediate node that assists the isolated node to join the network should be a node that has already joined the upper network or a sub-network. Otherwise, an isolated sub-network may be constructed.

Alternatively, in other examples, only a node that has joined a network is capable of feeding back the feedback message to the isolated node. That is, after receiving the network entry request, the node within the communication range of the isolated node would first check its own networking state, and then feedback the feedback message to the isolated node on condition that it has already joined a network. In this case, the node would also attach its networking state and its on-network time into the feedback message. Further, the attribute of the node may also be attached in the feedback message.

In some examples, if the isolated node is unable to receive any feedback message of the network entry request in a predefined period of time, it may indicate that the isolated node is of a far distance from the upper network. In this case, the isolate node only needs to continuously broadcast the network entry request and wait for a feedback message.

According to some examples of the present disclosure, after receiving one or more feedback messages in the predefined period of time, the isolate node may select a node with an earliest on-network time among the candidate intermediate nodes as the intermediate node.

In this case, the node which is within the communication range of the isolated node and joins the network first may be selected as the intermediate node of the isolated node. That is because the earlier a node joins the network, the more stable it may be. By joining the network via a more stable intermediate node, the isolated node can also keep a more stable operating state. In this way, an overall stability of the network can be ensured.

In a specific example, the on-network time of a node may be expressed by a network node index. The smaller the network node index is, the earlier the node joins the network. For example, a node with network node index 2 joined the network earlier than a node with network node index 3. Therefore, in the above step, the isolate node may select a node with a smallest network node index among the candidate intermediate nodes as the intermediate node.

It can be seen that by repeating the above procedure for each isolated node, the intermediate node of each isolated node would be determined. Then by step S105, the isolated node can be added into the upper network or one of the at least one sub-network according to the intermediate node.

In step S105, the isolated node may be added into the upper network or one of the at least one sub-network according to the attribute of the intermediate node and the networking state of the intermediate node.

In some examples of the present disclosure, as disclosed above, the attribute of a node may include primary or non-primary to indicate whether the node is a primary node or a non-primary node. To be noted, the primary nodes are preset. Specifically, a node in a specific position such as where a network grading is needed may be set as a primary node. In this way, by setting primary nodes in advance according to actual needs, the multistage network constructed may meet actual needs better.

Specifically, according to some examples, the isolated node would be added into the upper network or one of the at least one sub-network by the following steps.

At first, which network the intermediate node belongs to is determined. Moreover, the attribute of the intermediate node is determined.

In response to determining that the intermediate node belongs to the upper network and the attribute of the intermediate node is non-primary, the isolated node may be added into the upper network. Moreover, a connection between the isolated node and its intermediate node would be set.

In response to determining that the intermediate node belongs to the upper network and the attribute of the intermediate node is primary, a sub-network would be constructed. The head node of the sub-network constructed should be set as the intermediate node. Then, the isolated node may be added into the sub-network constructed. Moreover, a connection between the isolated node and its intermediate node would be set. Therefore, the isolated node may communicate with a node in the upper network through the connection between the isolated node and its intermediate node.

In response to determining that the intermediate node belongs to a sub-network, the isolated node may be added into the sub-network to which the intermediate node belongs. Moreover, a connection between the isolated node and its intermediate node would be set.

Alternatively, in some other examples, not only which network the intermediate node belongs to and the attribute of the intermediate node, but also the density of the plurality of nodes deployed is taken into consideration. That is because when the density of nodes in the network around the intermediate node is too large, if the network is not graded, communication congestions or even interruptions may occur. Therefore, a judgement on whether to construct a sub-network can be made based on the density of the plurality of nodes deployed. In some examples, a density threshold is preset and whether the density is large or not may be determined by comparing the density of the plurality of nodes deployed to the density threshold. For example, according to actual needs, the density threshold may be set as $50/km^2$ to $80/km^2$.

In these examples, the isolated node would be added into the upper network or one of the at least one sub-network by the following steps.

At first, which network the intermediate node belongs to is determined. The attribute of the intermediate node is also determined. Moreover, the density of the plurality of nodes deployed is compared to the preset density threshold.

In response to determining that the intermediate node belongs to a sub-network, the isolated node may be added into the sub-network to which the intermediate node belongs. And a connection between the isolated node and its intermediate node would be set.

In response to determining that the intermediate node belongs to the upper network and the attribute of the intermediate node is primary, a sub-network is constructed. The head node of the sub-network constructed is set as the intermediate node. Then, the isolated node may be added into the sub-network constructed. Moreover, a connection between the isolated node and its intermediate node would be set to establish a communication connection between the isolated node with the upper network.

In response to determining that the intermediate node belongs to the upper network, the attribute of the intermediate node is non-primary and the density of the plurality of nodes is smaller than the preset density threshold, the isolated node may be added into the upper network. Moreover, a connection between the isolated node and its intermediate node would be set.

In response to determining that the intermediate node belongs to the upper network, the attribute of the intermediate node is non-primary and the density of the plurality of nodes is larger than or equal to the preset density threshold, a sub-network is constructed. The head node of the sub-network constructed is the intermediate node. Then, the isolated node may be added into the sub-network constructed. Moreover, a connection between the isolated node and its intermediate node would be set to establish a communication connection between the isolated node with the upper network.

Figure 2:
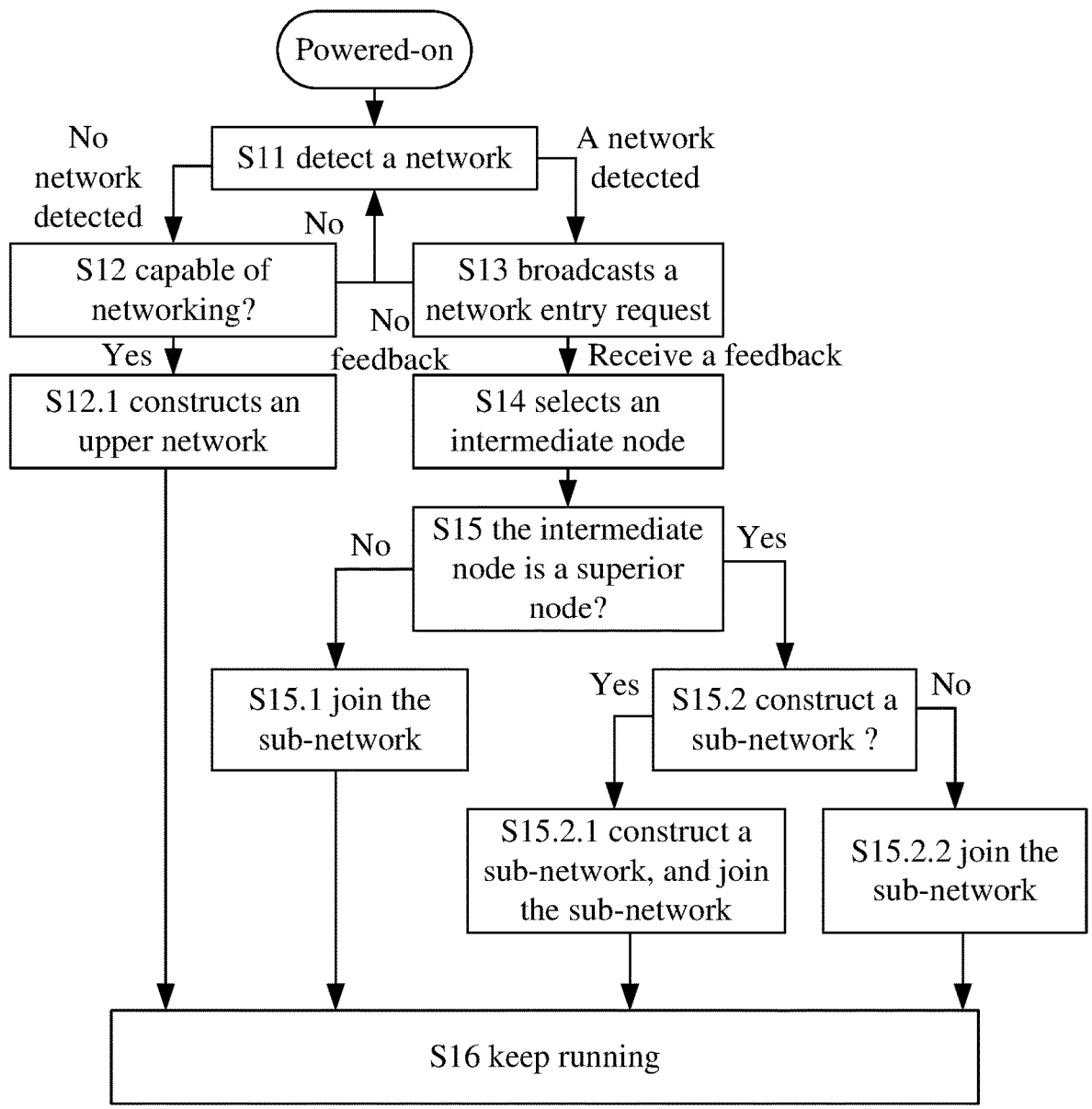
FIG. 2 is a schematic flowchart of a method for constructing a multistage network according to another example of the present disclosure.

For an easier understanding, the present disclosure provides a specific example to demonstrate an overall workflow of the above procedure. At first, a plurality of nodes is deployed in the network. FIG. 2 illustrates a specific procedure that each node may execute respectively.

S11: After the node is powered-on, the node initializes parameters, scans channels to detect a network. Then, in response to determining that no network is detected, proceed to S12.

Or, in response to determining that one or more network is detected, proceed to S13.

S12: the node detects whether itself is capable of networking.

In response to determining the node itself is not capable of networking, return to S11. Or in response to determining the node itself is capable of networking, proceed to S12.1.

S12.1: the node constructs an upper network with other powered-on nodes with capable of networking, and proceed to S16.

To be noted, the upper network may be constructed by the node and other nodes being powered-up at the same time and being capable of networking.

S13: the node broadcasts a network entry request and waits for a feedback message.

In response to determining that the feedback message is not received within a certain period of time, return to S11. Or, in response to determining one or more feedback messages are received within the certain period of time, proceed to S14.

S14: the node selects an intermediate node from the source nodes of the one or more feedback messages. Then, proceed to S15.

S15: the node detects whether the intermediate node is a superior node (i.e., a node that has joined the upper network) or a subordinate node (i.e., a node that has joined a sub-network).

In response to determining the intermediate node is a subordinate node, proceed to S15.1. Or, in response to determining the intermediate node is a superior node, proceed to S15.2.

S15.1: the node joins the sub-network to which the intermediate node belongs. Then, proceed to S16.

S15.2: judging whether it is necessary to construct a sub-network according to the attribute of the source node and the density of the plurality of nodes deployed.

In response to determining it is necessary to construct a sub-network, that is, the intermediate node is a primary node or the density of the plurality of nodes deployed is larger than or equal to the preset density threshold, proceed to S15.2.1.

In response to determining it is not necessary to construct a sub-network, that is, the intermediate node is a non-primary node and the density of nodes in the network is smaller than the density threshold, proceed to S15.2.2.

S15.2.1: the node constructs a sub-network, and joins the sub-network constructed. Then, proceed to S16.

S15.2.2: the node joins the upper network. Then, proceed to S16.

S16. the node keeps running periodically in an on-network state (has joined the upper network or a sub-network).

It should be noted that in the examples of the present disclosure, a node may get to know the networking state, the on-network time, the attribute of each of other nodes within a communication range of the node and also the density of the plurality of nodes deployed by virtue of communications. To be noted, those skilled in art would know a corresponding communication method used herein, which would not be described herein.

Based on the same concept, some examples of the present disclosure further provide a method for allocating resources in the multistage network. The multistage network in this method can be constructed by the method according to any one of the above examples. The method for allocating resources may include the following steps.

At first, a route from a source node to a destination node in the multistage network is constructed.

Finally, resources from the source node to the destination node are allocated along the route.

The method for allocating resources provided by the present disclosure is based on the multistage network in the above examples, having same effects of these examples. Specifically, by the method for allocating the resources provided by examples of the present disclosure, an overall channel occupancy rate of the network can be reduced and communication congestions or interruptions can be avoided.

Figure 3:
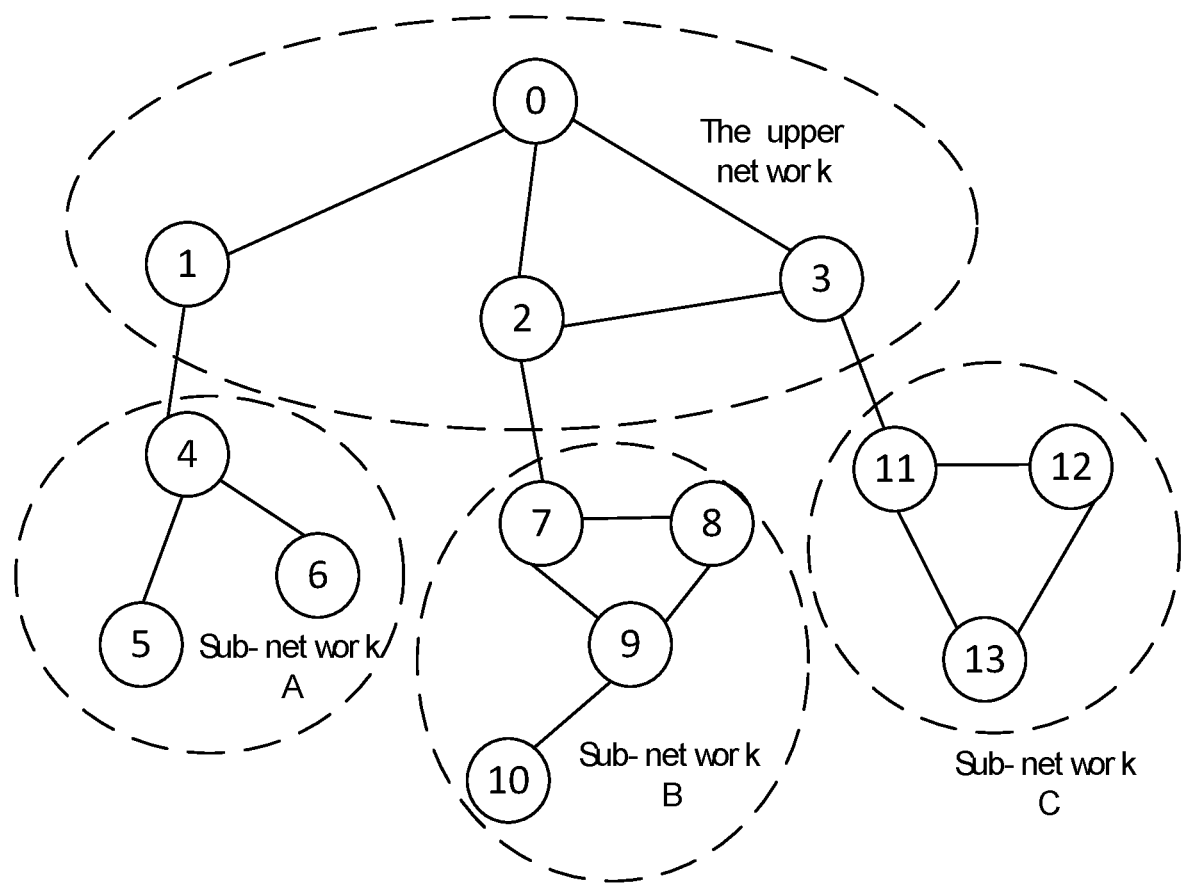
FIG. 3 is a schematic diagram of a multistage network constructed according to an example of the present disclosure.

FIG. 3 shows an example of the multistage network constructed by the method for constructing the multistage network according to any one of the above examples. In FIG. 3, nodes 0, 1, 2 and 3 constitute an upper network; nodes 4, 5 and 6 constitute a sub-network A; nodes 7, 8, 9 and 10 constitute a sub-network B; and nodes 11, 12 and 13 constitute a sub-network C. Each sub-network has a head node. The head node is a node, in the upper network, that directly communicates with the sub-network. For example, the head node of the sub-network A is the node 1, the head node of the sub-network B is the node 2, and the head node of the sub-network C is the node 3. Proper heads are selected from different sub-networks respectively. The sub-networks operate cooperatively through the heads. In this way, a large-scale hierarchical network can be finally constructed.

In some examples of the present disclosure, the step of constructing a route from a source node to a destination node in the multistage network may be conducted according to which networks the source node and the destination node belong to, including the following procedure.

At first, which networks the source node and the destination node belong to are determined.

In response to determining that the source node and the destination node belong to different sub-networks, a first route section from the source node to a first temporary node is first constructed. Then a second route section from the first temporary node to a second temporary node is constructed. Finally, a third route section from the second temporary node to the destination node is constructed. In the above process, the first temporary node may be a head node of a sub-network to which the source node belongs. The second temporary node may be a head node of a sub-network to which the destination node belongs. Please note that a head node of a sub-network is a node belongs to the upper network and connects to a node in the sub-network. Then, the route from the source node to the destination node can be formed by the first route section, the second route section and the third route section.

By way of an example, as shown in FIG. 3, assuming that the source node is the node 5, and the destination node is the node 9, it is necessary to first construct a route from the node 5 to the node 1 (the head node of the sub-network A), then construct a route from the node 1 to the node 2 (the head node of the sub-network B), and finally construct a route from the node 2 to the node 9.

In response to determining that the source node belongs to the upper network and the destination node belongs to a sub-network, a fourth route section from the source node to a third temporary node is first constructed. Then, a fifth route from the third temporary node to the destination node is constructed. In this process, the third temporary node may be the head node of the sub-network to which the destination node belongs. Then, the route from the source node to the destination node can be formed by the fourth route section and the fifth route section.

In response to determining that the source node belongs to a sub-network and the destination node belongs to the upper network, a sixth route section from the source node to a fourth temporary node is first constructed. Then a seventh route section from the fourth temporary node to the destination node is constructed. In this process, the fourth temporary node may be the head node of the sub-network to which the source node belongs. Then, the route from the source node to the destination node can be formed by the sixth route section and the seventh route section.

By way of an example, as shown in FIG. 3, assuming that the source node is the node 5, and the destination node is the node 3, it is necessary to first construct the route from the node 5 to the node 1 (the head node of the sub-network A), and then construct a route from the node 1 to the node 3.

In response to determining that the source node and the destination node belong to a same sub-network or the same upper network, a route from the source node to the destination node may be constructed directly.

It can be seen that in the above process, a route from the source node to the destination node can be formed step by step in different stages of the multistage network. Further, according to a routing result, network resources can be allocated gradually in each sub-network and the upper network. This process may further reduce an overall channel occupancy rate of the network and avoid communication congestions or even interruptions.

For an easier understanding, the present disclosure provides another specific example B to demonstrate the above process of constructing the route from the source node to the destination node.

When the network has a business request, a media access layer of the source node may receive upper business from a network layer. In this case, the source node may first detect a route to the destination node.

In response to determining that there is a route to the destination node, proceed to S21.1. Or in response to determining that there is no route to the destination node, proceed to S21.2.

S21: the source node may follow the route to forward the business.

S22: the source node may detect and judge whether the destination node is in a same sub-network with the source node.

In response to determining that the destination node is in a same sub-network with the source node, proceed to S22.1.

In response to determining that the destination node is not in a same sub-network with the source node, proceed to S22.2.

S22.1: the source node may form a route to the destination node directly.

S22.2: the source node may set the head node of the sub-network to which the source node belongs as a first temporary node, then proceed to S22.3.

S22.3: the source node may form a first route section from the source node to the first temporary node and forward the business request to the first temporary node, and then proceed to S22.4.

S22.4: after receiving the business request, the first temporary node may traverse various sub-networks, and set the head node of the sub-network to which the destination node belongs as a second temporary node. Then proceed to S22.5.

S22.5: the first temporary node may form a second route section from the first temporary node to the second temporary node, forward the business request to the second temporary node, and then proceed to S22.6.

S22.6: the second temporary node may form a third route section from the second temporary node to the destination node.

It can be seen that a final route from the source node to the destination node can be formed based on the first route section, the second route section and the third route section.

Moreover, After the above routing process, the network may further allocate resources according to the final route from the source node to the destination node.

For an easier understanding, the present disclosure provides a specific example C to demonstrate the above resource allocation process.

In a case that the network has a business requirement, the media access layer of the source node may receive upper business from the network layer. Then, the following process may be executed.

S31: resources may be allocated to the source node. And proceed to S33.

S33: whether the destination node is in the same sub-network with the source node is determined.

In response to determining the destination node is in the same sub-network with the source node, and proceed to S33.1. Or in response to determining the destination node is not in a same sub-network with the source node, and proceed to S33.2.

S33.1: resources are allocated in one step, and proceed to S33.6.

S33.2: the head node of the sub-network to which the source node belongs is set as the first temporary node mentioned above, a temporary business is obtained, and proceed to S33.3.

S33.3: resources are allocated from the source node to the first temporary node, and proceed to S33.4.

S33.4: after the business arrives at the first temporary node, the first temporary node traverses various sub-networks, and resources are allocated taking the head node of the sub-network to which the destination node belongs as a destination for further resource allocation, and proceed to S33.5.

S33.5: resources are allocated from the head node of the sub-network to which the destination node belongs to the destination node.

In this way, resources allocation is completed.

It should be noted that the method in the examples of the present disclosure can be executed by a single device, for example, a computer, a server, etc. The method in the examples can also be applied to a distributed scene, and can be completed by a plurality of devices cooperating with each other. In the case of such a distributed scene, one of the plurality of devices can only execute one or more steps of the method in the examples of the present disclosure, and the plurality of devices may interact with each other to complete the method.

It should be noted that, specific examples of the present disclosure have been described above. Other examples are within the scope of the appended claims. In some cases, the actions or steps recited in the claims can be performed in an order different from that in the examples, and can still achieve desired results. In addition, the processes depicted in the accompanying drawings are not necessarily required to be shown in a particular or sequential order, to achieve desired results. In some implementations, multi-task processing and parallel processing are also possible or may be advantageous.

Figure 4:
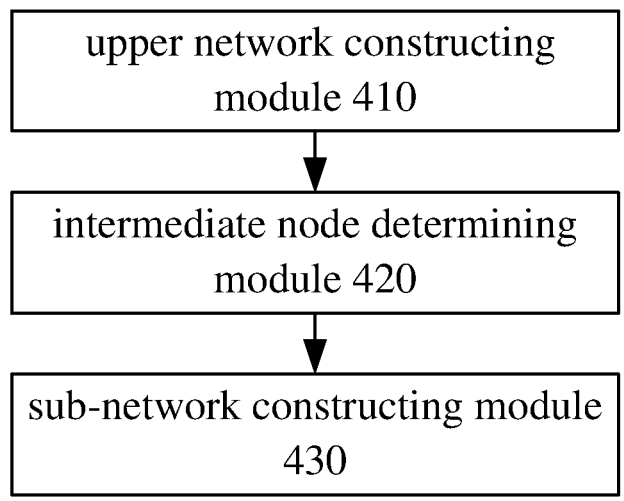
FIG. 4 is a schematic diagram illustrating a structure of a device for constructing a multistage network according to an example of the present disclosure.

Based on the above methods, the present disclosure also provides a device for constructing a multistage network based on hierarchical networking. FIG. 4 is a schematic diagram illustrating a structure of the device according to an example of the present disclosure. As shown in FIG. 4, the device may include the following modules.

An upper network constructing module 410, configured to deploy a plurality of nodes and construct an upper network with at least one node of the plurality of nodes.

An intermediate node determining module 420, configured to determine an intermediate node for an isolated node detected.

A sub-network constructing module 430, configured to add the isolated node into the upper network or one of the at least one sub-network according to the intermediate node.

The device for constructing a multistage network provided by the present disclosure can build a multistage network. By the device, the problem of a limited scale of a distributed network with a planar structure can be solved. Moreover, the device can be used to construct a large-scale self-organizing network with more nodes. Also, the structure of the multistage network is relatively clear, which makes the multistage network easier to be managed and expanded.

To be noted, the above modules may execute the method described in examples stated above to implement their functions respectively.

Based on the same inventive concept, one example of the present disclosure may further provide a device for allocating resources. The device for allocating resources can be applied to the multistage network constructed by the device for constructing the multistage network according to any one of the above examples. The device for allocating resources may include the following modules.

A route constructing module, configured to construct a route from a source node to a destination node in the multistage network.

A resource allocation module, configured to allocate resources from the source node to the destination node along the route.

The device for allocating resources provided by the present disclosure is based on the multistage network in the above examples. Therefore, the device for allocating resources may have beneficial effects of the device for constructing the multistage network. Specifically, by the device for allocating resources provided by the examples of the present disclosure, an overall channel occupancy rate of the network can be reduced and communication congestions or even interruptions can be avoided.

Figure 5:
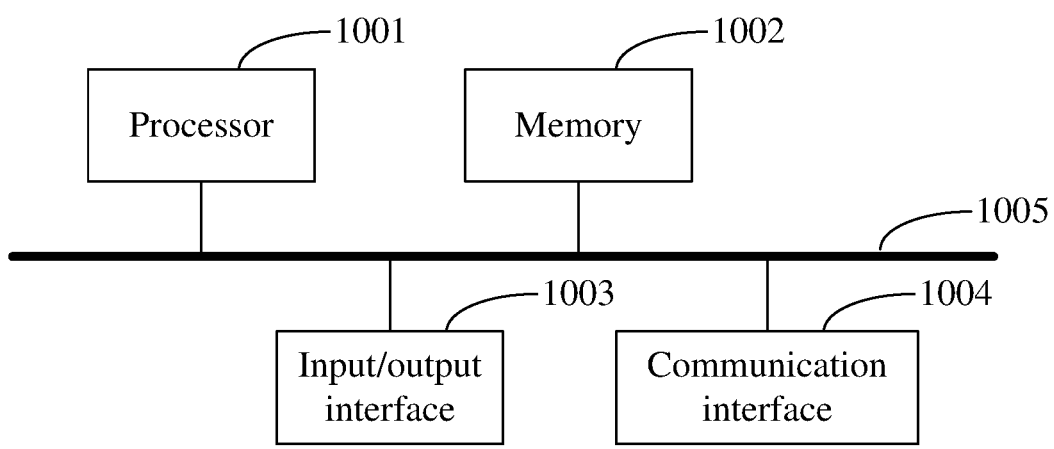
FIG. 5 is a schematic diagram illustrating a structure of an electronic device according to an example of the present disclosure.

Based on the above methods, the present disclosure also provides an electrical device for implementing the method disclosed above. FIG. 5 is a schematic diagram illustrating a structure of an electrical device according to an example of the present disclosure.

As shown in FIG. 5, the electronic device may include one or more processors 1001, a memory 1002. In FIG. 5, only one processor 1001 is illustrated. The electronic device may further include an input/output interface 1003, a communication interface 1004, and a bus 1005. The processor 1001, the memory 1002, the input/output interface 1003, and the communication interface 1004 may couple to each other via the bus 1005.

To be noted, a computer program stored in the memory and executable on the processor, wherein the processor executes the program to implement the methods described above.

The processor 1001 may execute the relevant procedures by virtue of a general central processing unit (CPU), a microprocessor, an application specific integrated circuit (ASIC), or one or more integrated circuits, so as to implement the technical solution provided by the examples of the description.

The memory 1002 may be implemented by a read only memory (ROM), a random-access memory (RAM), a static memory device and a dynamic memory device, etc. The memory 1002 may store an operating system and other application procedures. When the technical solution provided by the example of the description is implemented via the software or the hardware, the related procedure codes are stored in the memory 1002 and revoked by the processor 1001.

The I/O interface 1003 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1004 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1005 includes a passage which transmits information among various components (for example, the processor 1001, the memory 1002, the I/O interface 1003 and the communication interface 1004) on the device.

It should be noted that, although the above-mentioned device merely shows the processor 1001, the memory 1002, the I/O interface 1003 and the communication interface 1004 and the bus 1005, the device may further include other components required by the normal operation in the specific implementation process. Besides, those skilled in the art could appreciate that the above-mentioned device may merely include the components required by the solution in the examples of the Description, but not necessarily include all components shown in the figure.

The electronic device according to the foregoing examples is used for implementing the corresponding method in any one of the foregoing examples, and has the beneficial effects of the corresponding method examples, which are not repeated in detail.

The flowcharts and block diagrams in the drawings illustrate the system architecture, functionality, and operation possibly implemented by systems, methods and computer program products according to various examples of the present invention. In this regard, each block in the flowcharts or block diagrams may represent a unit, program segment, or portion of code, which comprises one or more executable instructions for implementing the specified logical function(s). It should also be also noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It should also be also noted that each block and combination of blocks in the flowcharts or block diagrams can be implemented by special purpose hardware-based systems which perform the specified functions or steps, or combinations of special purpose hardware and computer instructions.

The units or units involved in the examples of the present disclosure may be implemented by means of software or programmable hardware. The depicted units or units may be also arranged in the processor, and the titles of these units or units do not constitute the definition thereof in some cases.

Based on the same inventive concept, corresponding to the methods according to any one of the foregoing examples, the present disclosure further provides a non-transitory computer readable storage medium which stores a computer instruction used for enabling the computer to perform the method according to any one of the examples.

The computer readable medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

The computer instruction stored by the storage medium according to the foregoing examples is used for enabling the computer to perform the method according to any one of the examples, and has the beneficial effects of the corresponding method examples, which are not repeated in detail.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g., circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A method for constructing a multistage network based on hierarchical networking, the multistage network comprising an upper network and a sub-network;

and the method comprising:

deploying a plurality of nodes; wherein the plurality of nodes comprises at least one isolated node;

constructing the upper network with at least one node of the plurality of nodes;

for each isolated node, determining an intermediate node for the isolated node according to a networking state and an on-network time of each node within a communication range of the isolated node; wherein, the isolated node is a node among the plurality of nodes that has not joined any network; wherein, the networking state comprises: having joined the upper network, having joined a sub-network, or having not joined any network; the determining the intermediate node for the isolated node according to the networking state and the on-network time of each node within the communication range of the isolated node comprises: broadcasting, by the isolated node, a network entry request to the plurality of nodes; in response to receiving a feedback message responding to the network entry request from a source node having joined a network, taking the source node of the feedback message as a candidate intermediate node; wherein, the source node having joined a network is a node has joined the upper network or a sub-network; and selecting a node with an earliest on-network time among the candidate intermediate nodes as the intermediate node; and adding the isolated node into the upper network or constructing a sub-network and adding the isolated node into the sub-network constructed or adding the isolated node into a sub-network to which the intermediate node belongs according to any one of an attribute of the intermediate node, a networking state of the intermediate node and a density of the plurality of nodes; wherein, the networking state comprises: having joined the upper network, having joined a sub-network, or having not joined any network; the attribute comprises primary or non-primary;

wherein, the adding the isolated node into the upper network or constructing a sub-network and adding the isolated node into the sub-network constructed or adding the isolated node into the sub-network to which the intermediate node belongs according to any one of the attribute of the intermediate node, the networking state of the intermediate node and the density of the plurality of nodes comprises: in response to determining that the intermediate node belongs to a sub-network, adding the isolated node into the sub-network to which the intermediate node belongs;

the adding the isolated node into the upper network or constructing a sub-network and adding the isolated node into the sub-network constructed or adding the isolated node into a sub-network to which the intermediate node belongs according to any one of the attribute of the intermediate node, the networking state of the intermediate node and the density of the plurality of nodes further comprises: in response to determining that the intermediate node belongs to the upper network and the attribute of the intermediate node is primary, constructing, by the isolated node, a sub-network, and adding the isolated node into the sub-network constructed; and the adding the isolated node into the upper network or constructing a sub-network and adding the isolated node into the sub-network constructed or adding the isolated node into the sub-network to which the intermediate node belongs according to any one of the attribute of the intermediate node, the networking state of the intermediate node and the density of the plurality of nodes further comprises: in response to determining that the intermediate node belongs to the upper network, the attribute of the intermediate node is non-primary, and the density of the plurality of nodes is larger than or equal to a preset density threshold, constructing a sub-network, and adding the isolated node into the sub-network constructed; or in response to determining that the intermediate node belongs to the upper network, the attribute of the intermediate node is non-primary, and the density of the plurality of nodes is smaller than the preset density threshold, adding the isolated node into the upper network.

2. A method for allocating multistage resources applied in a multistage network constructed by the method according to claim 1, comprising:
   constructing a route from a source node to a destination node in the multistage network; and
   allocating resources from the source node to the destination node along the route.

3. The method according to claim 2, wherein, constructing a route from a source node to a destination node comprises:
   in response to determining the source node and the destination node belong to different sub-networks, constructing a route section from the source node to a first temporary node;
   constructing a route section from the first temporary node to a second temporary node;
   constructing a route section from the second temporary node to the destination node;
   wherein, the first temporary node is a head node of a sub-network to which the source node belongs; the second temporary node is a head node of a sub-network to which the destination node belongs; and a head node of a sub-network is a node, in the upper network, that directly communicates with the sub-network.

4. The method according to claim 2, wherein, constructing a route from a source node to a destination node further comprises:
   in response to determining the source node belongs to the upper network and the destination node belongs to a sub-network, or in response to determining the source node belongs to a sub-network and the destination node belongs to the upper network,
   constructing a route section from the source node to a third temporary node;
   constructing a route section from the third temporary node to the destination node;
   wherein, the third temporary node is a head node of a sub-network to which the destination node belongs; and a head node of a sub-network is a node, in the upper network, that directly communicates with the sub-network.

5. An electronic device, comprising a memory, a processor, and a computer program stored in the memory and executable on the processor, wherein the processor executes the computer program to implement the method of claim 1.

* * * * *